May 24, 1966   C. C. MADDEN   3,252,685
TURBINE SPEED CONTROL
Filed Aug. 29, 1963
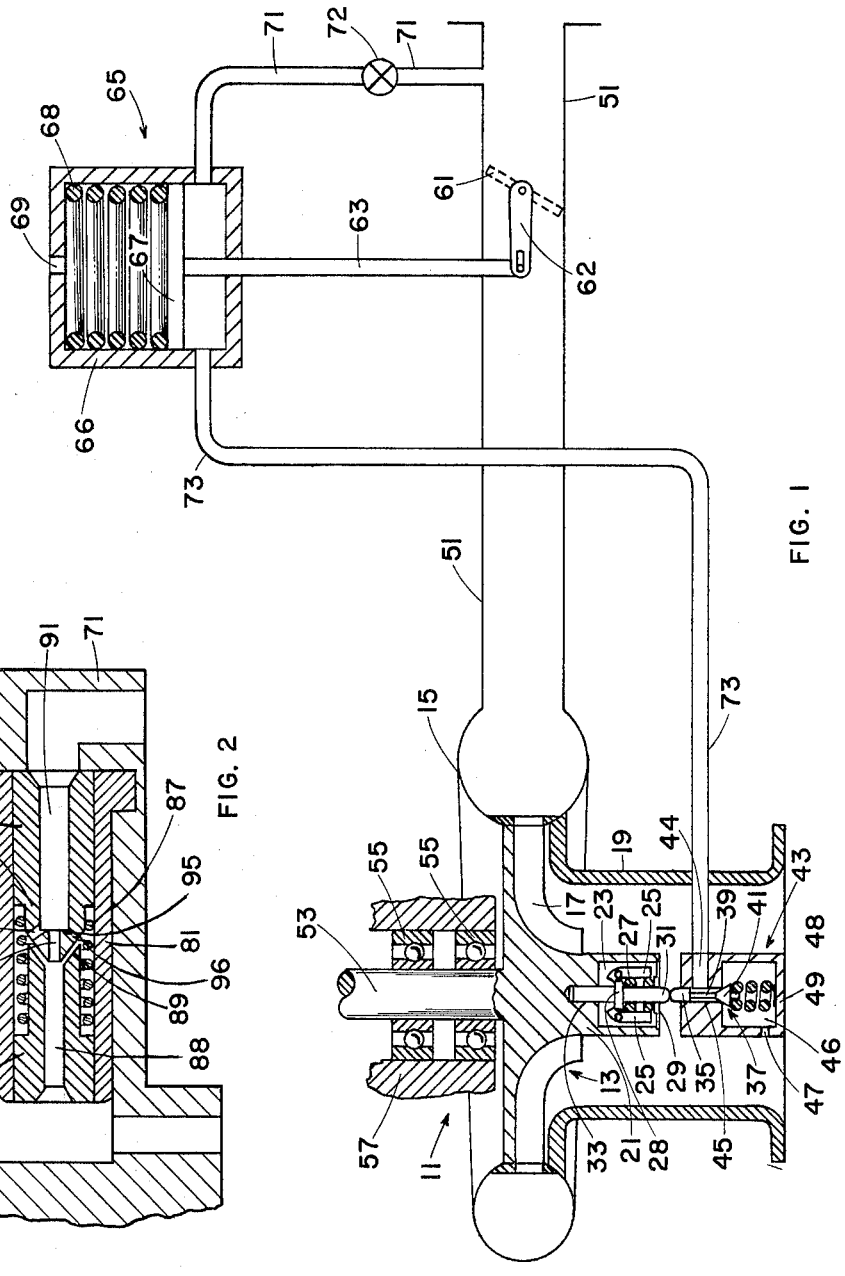
INVENTOR.
CHARLES C. MADDEN
BY
Robert W. Ely
ATTORNEY United States Patent Office 3,252,685
Patented May 24, 1966

3,252,685
TURBINE SPEED CONTROL
Charles C. Madden, New Hartford, N.Y., assignor to The Bendix Corporation, Oneida, N.Y., a corporation of Delaware
Filed Aug. 29, 1963, Ser. No. 305,339
4 Claims. (Cl. 253—52)

This invention relates to gas turbine control and more particularly concerns a gas turbine having a flow regulating valve and pneumatic control means for operating the valve.

An object of the present invention is to provide a gas turbine system wherein control means will adjust gas supply valve means for regulating flow and hence proper speed and then close when the turbine begins to overspeed wherby damage to the turbine and associated equipment will be prevented.

Another object is to provide such a gas turbine control system having normally closed but adjustable bleed or vent means and speed sensor as a single unit so connected to pneumatic operating means connected to a valve arranged to give speed control and to be actuated to close the valve by an overspeeding turbine wheel.

An additional object of the present invention is to provide a single pneumatic control device having cooperating speed responsive element, vent valve and a piston-actuated valve for speed control and for turbine safety by adjustment or shut down, which is programmed by a variable orifice. The realization of the above objects, along with features and advantages of the invention will be apparent from the following detailed description and the accompanying drawing in which:

FIGURE 1 is a partly diagrammatic representation with parts in cross section of an embodiment of the invention and shows a radial flow turbine and closed vent means before speed actuation with the vent means connected to pneumatic actuator means which connects to a butterfly valve in the gas supply pipe, and FIGURE 2 is a cross-sectional view of the variable orifice located between the valve actuator and the inlet pipe.

Referring to FIGURE 1, the turbine 11 which includes a radial-flow turbine wheel 13, an annular manifold 15 for directing air to the peripheral inlet ends of the curved blades 17 of the turbine wheel 13 and a tubular exhaust duct 19 encasing the side of the turbine wheel 13 which has blades 17 and an axial hub projection 21. Projection 21 has an axial recess 23 which contains a plurality of J-shaped fly weights 25, a spring 27 confined by plunger shoulder 28 and by cover 29 and biasing the shoulder 28 against inner ends of the fly weights 25 to resist centrifugal action, and a plunger or element 31 slidably-mounted in axial bore 33 in the hub 21. The outer end of plunger 31 contacts (and will be closely spaced from) the end 35 of vent valve element 37. A valve element rod 39 connects contact and 35 to the valve member 41.

Valve element 37 is slidably mounted by its contact head 35 in a vent housing 43 which has a lateral passage 44 and an axial bore 45 providing flow to valve head chamber 46 when valve member 41 is spaced from the lower end of axial bore 45. Chamber 46 is unrestrictedly vented by lateral passage 47. Spring 48 biases the valve element 41 against the valve seat since confined at its opposite end by housing bottom wall 49.

A large air supply pipe 51 connects to the manifold 15. The upper or other side of the turbine wheel 13 has a support shaft 53 extending axially and being mounted in ball bearings 55 which is supported in housing support structure 57. The turbine wheel normally has a fixed plane of rotation in the absence of tilting due to bearing failure or other cause.

To the right of the turbine 11, a butterfly valve 61 is mounted in supply pipe 51 with its operating arm 62 connected to a piston rod 63 of a pistor actuator 65. This actuator has a cylindrical housing 66, a piston 67 connected to rod 63, and a spring 68 above the piston 67 urging it downwardly. It is to be noted that, before air pressure is available and applied to the bottom of piston actuator 67, the spring 68 normally positions the piston so that the butterfly valve 61 is in closed position. This provides an automatic check of actuator operability at start up.

A first pipe 71 having a variable orifice or valve 72 connects to the bottom interior of piston housing 66 below piston actuator 67 and a second pipe 73 similarly connects below the piston actuator 67. Housing 66 has a top wall vent 69. First pipe 71 connected to the bottom of the piston actuator 65 opens into supply pipe 51 upstream of butterfly valve 61 while the second pipe 73 similarly opens into the axial bore 45 of the vent housing 43 between the contact head 35 and the valve member 41 at the location of the valve element rod 39.

Referring to FIGURE 2 of the drawing, it can be seen that the variable orifice 72 is shown attached to the housing 66 of the butterfly valve actuator 65. The pipe 71 (to the right) connects to the air supply pipe 51 as shown in FIGURE 1. Thus, air is provided at the right and then, as will be explained, varied flow results as the air moves to the left to the vertical passage in housing 66.

The variable orifice is comprised of four basic elements. A sleeve 81 is fitted into the housing 66 permanently by means of a radially-outwardly-extending flange 82 which is at the right adjacent pipe 71. Another element is the fixed member 83 to the left. Another element is the axially-moveable element 85 to the right. The fourth element is the spring 87 which is confined by a ledge or shoulder of the element 83 and by a facing shoulder of the element 85, whereby element 85 is biased against the pipe 71 to the right due to the force exerted by spring 87.

Element 83 has a central passage 88 which begins at the right and extends from the leftward end of the conical surface 89. Spaced slightly from conical surface 89 is the left part of moveable element 85. Element 85 has a central passage 91 which extends from the right to the left and has at the leftward end a smaller central bore 93 and a plurality of inclined ports 95. Ports 95 open into the conical space or passage between concave surface 89 of element 83 and mating conical or convex surface 96 of element 85. The central bore 93 is aligned with, and discharges into, the central passage 88 of element 83.

It is apparent that this variable orifice device, at a predetermined range of low pressures, will remain positioned as shown so that large total flow is provided by ports 95 and axial bore 93 and then larger passage 88. However, when the pressure reaches the top limit of the low pressure range, element 85 will be urged to the left overcoming spring 87 and the two mating conical surfaces 89 and 96 will abut so that no air will flow through ports 95 and then into passage 88. The air will then flow only through the small central passage 93 and then into the larger central passage 88 of element 83. This would occur at a predetermined pressure above the previously-mentioned top limit of the low pressure range. Intermediate of this high pressure and the top limit of this low pressure range, it is obvious that the spacing between the elements 85 and 83 will vary and hence, the flow through 95, through the inclined passage between the two conical surfaces 89 and 96 and eventually to 88 will vary. Thus, the invention provides a simple, reliable and inexpensive variable orifice whereby control can be effected over wide pressure range, heretofore, not achievable with fixed orifices or with fixed large and small orifices.

It is believed that the operation of the turbine speed control is apparent from the foregoing description. Thus, in reverse order as to sequence and assuming start-up to the desired normal speed range with an inlet pressure of 25 to 250 p.s.i., it is obvious that when the governor is actuated by a predetermined high speed that the flow through the piston will be increased, modulating the turbine speed. The modulation range speed can be adjusted by changes in the governor weights- and/or orifice. Although the present invention is capable of continuously modulating turbine wheel speed over a wide range of gas supply pressures, it is currently designed for use in driving 400 c.p.s. electrical generators for aircraft. Naturally, it is desirable that generator speed remain constant. In such an aircraft application, the inlet gas supply pressures have essentially two values: a high pressure occurring during take-off and other full power operations and a lower pressure occurring during cruising. In response to that application, the present embodiment of the variable orifice is primarily a two-stage valve having a low resistance flow path and a higher resistance flow path.

The new present invention is capable of stable, swift and precise control of turbine wheel speed over a large range of gas supply pressures. The invention is compact, and relatively inexpensive to manufacture and assemble. It is capable of use in a wide range of systems over a broad range of air supply pressures. In addition, the invention can be readily installed and used on existing turbine systems.

It is to be understood that persons skilled in the art can make changes in the disclosed system embodying the invention without departure from the invention as set forth in the following claims.

What is claimed is:

1. A pneumatic control system for an air turbine wheel comprising:
   a rotatable turbine wheel;
   speed responsive valve means adapted to be connected to the turbine wheel movable in response to the rotational speed thereof;
   gas supply means including an air supply passage for supplying air to drive the turbine wheel;
   pressure responsive actuator means upstream of said turbine wheel operative to control the air supply to said turbine wheel;
   variable orifice and valve means connected to said gas supply means upstream of said pressure responsive actuator means having a movable valve element and a fixed valve seat element, said movable valve element having a central inlet flow path and a plurality of outlet flow paths disposed in a frusto-conical outlet portion, said fixed valve seat element having a cooperating frusto-conical inlet portion leading to a flow path formed therethrough, said movable valve element resiliently biased relative to said fixed valve seat element;
   said variable orifice and valve means varying the air flow path therethrough responsive to changing pressures in said gas supply means; and
   said speed responsive valve means and said variable orifice and valve means fluidly connected to said pressure responsive actuator to cooperatively regulate said air supply to the turbine wheel, controlling the rotational speed of the turbine wheel.

2. A turbine system having a pneumatic control comprised of:
   a rotatable turbine wheel;
   gas supply means including an air supply passage for supplying gas to drive said turbine wheel;
   valve means in said passage adapted to move between open and closed positions to regulate the gas flow to said turbine wheel;
   a pressure responsive actuator connected to said valve means to control the regulating position thereof, said actuator having a reference chamber and a control chamber;
   first passage means interconnecting said pressure responsive actuator and said air supply passage upstream of said valve means to supply control pressure to said actuator;
   speed responsive means connected to said turbine wheel, movable in response to the rotative speed thereof;
   a vent valve element fluidly connected to said actuator to vary the control pressure in response to movement thereof, said vent valve connected to said speed responsive means to control said actuator in response to the speed of said turbine wheel;
   a second passage means interconnecting said control chamber to said vent valve element such that said vent valve is speed responsive variable bleed of said control chamber;
   variable orifice and valve means operatively connected to said passage means to control the flow of control pressure therethrough; and
   said orifice and valve means including a movable valve member having first and second positions, said valve member operative in said first position to reduce pressure supplied to said control chamber a first predetermined degree to permit a relatively large flow to said actuator and in said second position to reduce pressure supplied to said control chamber a second predetermined degree, whereby said turbine wheel is operated at a substantially-constant speed over a wide range of gas supplied pressures.

3. A turbine system having a pneumatic control comprising:
   a rotatable turbine wheel;
   gas supply passage means including an air supply for supplying gas to drive said turbine wheel;
   valve means in said passage adapted to move between open and closed positions to regulate the gas flow to said turbine wheel;
   a pressure responsive actuator connected to said valve means to control the regulating position thereof, said actuator having a reference chamber and a control chamber;
   first passage means interconnecting said pressure responsive actuator and said air supply passage, upstream of said valve means to supply control pressure to said actuator control chamber;
   speed responsive means connected to said turbine wheel movable in response to the rotative speed thereof;
   a vent valve element fluidly connected to said actuator to vary the control pressure in response to movement thereof, said vent valve connected to said speed responsive means to control said actuator in response to the speed of said turbine wheel;
   a second passage means interconnecting said control chamber to said vent valve element such that said vent valve is a speed responsive variable bleed of said control chamber;
   variable orifice and valve means operatively connected to said passage means to control the flow of control pressure therethrough;
   said orifice and valve means including a movable valve member having a large flow path leading from said first passage means to a plurality of small flow paths; and
   a fixed valve seat element adapted to cooperate with said movable valve element to block some of said small flow paths, said movable valve element biased relative to said fixed valve element by a resilient means, said movable valve element and said fixed valve element operative to reduce control chamber pressure and substantially discrete predetermined amounts in response to variable gas supply pressures whereby said turbine wheel is operated with a substantially constant speed over a wide range of gas pressures.

4. A turbine system having a pneumatic control comprising:

a rotatable turbine wheel;

gas supply passage means including an air supply for supplying gas to drive said turbine wheel;

valve means in said passage adapted to move between open and closed positions to regulate the gas flow to said turbine wheel;

a pressure responsive actuator connected to said valve means to control the regulating position thereof;

passage means interconnecting said pressure responsive actuator and said air supply passage upstream of said valve means to supply control pressure to said actuator;

speed responsive means connected to said turbine wheel movable in response to the rotative speed thereof;

a vent valve element fluidly connected to said actuator to vary the control pressure in response to movement thereof, said vent valve connected to said speed responsive means to control said actuator in response to the speed of said turbine wheel;

variable orifice and valve means operatively connected to said passage means to control the flow of control pressure therethrough;

said orifice and valve means including a movable valve member having a first passage and a second passage therethrough; and a fixed valve seat member having a third passage therethrough; said movable valve member cooperating with said fixed valve seat member to resist gas flow through said second passage, thereby controlling the gas flow to said actuator; said orifice and valve means including further a resilient means to bias said movable valve member relative to said fixed valve seat member to permit gas flow through said first passage and said second passage with minimum resistance; said movable valve member responsive to pressurized gas transmitted from said air supply passage to move said movable member at predetermined pressures against said resilient means toward said fixed valve seat member, operative to close said second passage and reduce pressure supplied to said actuator whereby said turbine may be maintained at a substantially constant speed over a wide range of gas supply pressures.

References Cited by the Examiner

UNITED STATES PATENTS

| 1,093,116 | 4/1914 | Cubelic | 253—59 |
| 2,865,602 | 12/1958 | Whittle | 253—59 |
| 2,879,032 | 3/1959 | Whittle | 253—143 X |
| 3,087,305 | 4/1963 | Hertzog | 253—59 X |
| 3,164,368 | 1/1965 | Klein | 253—52 |

FOREIGN PATENTS

| 1,034,159 | 4/1953 | France. |
| 834,833 | 5/1960 | Great Britain. |
| 860,360 | 2/1961 | Great Britain. |

SAMUEL LEVINE, *Primary Examiner.*

JULIUS E. WEST, *Examiner.*

E. A. POWELL, *Assistant Examiner.*